United States Patent
Charters et al.

(10) Patent No.: US 9,456,024 B1
(45) Date of Patent: Sep. 27, 2016

(54) CONTENT SHARING IN MOBILE AD HOC NETWORKS

(71) Applicant: International Business Machines Corporation, Armonk, NY (US)

(72) Inventors: Graham C. Charters, Southampton (GB); Bret W. Dixon, South Perth (AU); Benjamin T. Horwood, Northbridge (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,236

(22) Filed: Nov. 24, 2015

(51) Int. Cl.
  *G06F 15/16* (2006.01)
  *H04L 29/08* (2006.01)
  *H04W 84/18* (2009.01)
  *G06F 17/30* (2006.01)

(52) U.S. Cl.
  CPC ......... *H04L 67/06* (2013.01); *G06F 17/30867* (2013.01); *H04W 84/18* (2013.01)

(58) Field of Classification Search
  CPC .................................................... H04L 67/06
  USPC ......................................................... 709/204
  See application file for complete search history.

(56) References Cited

U.S. PATENT DOCUMENTS

| 7,181,214 B1* | 2/2007 | White | H04W 40/026 370/310.2 |
|---|---|---|---|
| 8,406,206 B2 | 3/2013 | Chiang | |
| 9,100,989 B2 | 8/2015 | Ray et al. | |
| 2009/0006536 A1 | 1/2009 | Elliott et al. | |
| 2012/0258727 A1* | 10/2012 | Wong | H04W 4/02 455/456.1 |
| 2012/0309425 A1* | 12/2012 | El Khayat | H04L 67/18 455/456.3 |
| 2015/0257142 A1* | 9/2015 | Ueda | H04W 40/24 370/329 |

FOREIGN PATENT DOCUMENTS

WO   2015089695 A1   6/2015

OTHER PUBLICATIONS

Clay et al., "Posting Protocol for Improved Keyword Search Success in Peer-to-Peer File Sharing Systems," Multimedia Computing and Networking, 2003, p. 138-149, Proceedings of SPIE vol. 5019, SPIE-IS&T.

Klemm et al., "A Special-Purpose Peer-to-Peer File Sharing System for Mobile Ad Hoc Networks," IEEE, 2003, p. 2758-2763, University of Dortmund, Dortmund, Germany.

Lee et al., "InterMR: Inter-MANET Routing in Heterogeneous MANETs," IEEE, 2010, p. 372-381.

(Continued)

*Primary Examiner* — Arvin Eskandarnia
(74) *Attorney, Agent, or Firm* — Patricia B. Feighan; Steven Chiu

(57) ABSTRACT

A method for sharing a plurality of content in a mobile ad hoc network is provided. The method may include registering the plurality of content for sharing on a first mobile device, whereby the registered plurality of content is associated with a plurality of descriptive keywords. The method may also include responding, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

20 Claims, 8 Drawing Sheets

(56) References Cited

OTHER PUBLICATIONS

Lim et al., "MANET_ID: Improvement on Group Communications and ZRP," Second International Conference on Systems and Networks Communications (ICSNC), 2007, 7 Pages, IEEE Computer Society.

Ma et al., "An Epidemic P2P Content Search Mechanism for Intermittently Connected Mobile Ad hoc Networks," IEEE "GLOBECOM" 2009 Proceedings, 2009, 6 Pages, IEEE Communications Society.

Mell et al., "The NIST Definition of Cloud Computing," National Institute of Standards and Technology, Sep. 2011, p. 1-3, Special Publication 800-145.

* cited by examiner

CONTENT SHARING IN MOBILE AD HOC NETWORKS

BACKGROUND

The present invention relates generally to the field of computers, and more particularly to mobile ad hoc networks.

Mobile ad hoc networks (MANETs) have been a popular research topic and with the growth of wireless devices such as laptops, tablets, and smartphones, MANETs are becoming more relevant. With a MANET, a network can be formed by the proximity of mobile devices, such as laptops, tablets, and smartphones. As such, users moving about a city, potentially millions of people, may connect to each other. For example, MANETs allow mobile wireless devices to connect to each other in an ad hoc manner when they come within range of each other, and disconnect when they move out of range. Furthermore, since nodes in a MANET connect to each other as they come within range, the nodes that any one member connects to can change as nodes move about in relation to each other.

SUMMARY

According to one embodiment, a method for sharing a plurality of content in a mobile ad hoc network is provided. The method may include registering the plurality of content for sharing on a first mobile device, whereby the registered plurality of content is associated with a plurality of descriptive keywords. The method may also include responding, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

According to another embodiment, a computer system for sharing a plurality of content in a mobile ad hoc network is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include registering the plurality of content for sharing on a first mobile device, whereby the registered plurality of content is associated with a plurality of descriptive keywords. The method may also include responding, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

According to yet another embodiment, a computer program product for sharing a plurality of content in a mobile ad hoc network is provided. The computer program product may include one or more computer-readable storage devices and program instructions stored on at least one of the one or more tangible storage devices, the program instructions executable by a processor. The computer program product may include program instructions to register the plurality of content for sharing on a first mobile device, whereby the registered plurality of content is associated with a plurality of descriptive keywords. The computer program product may also include program instructions to respond, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
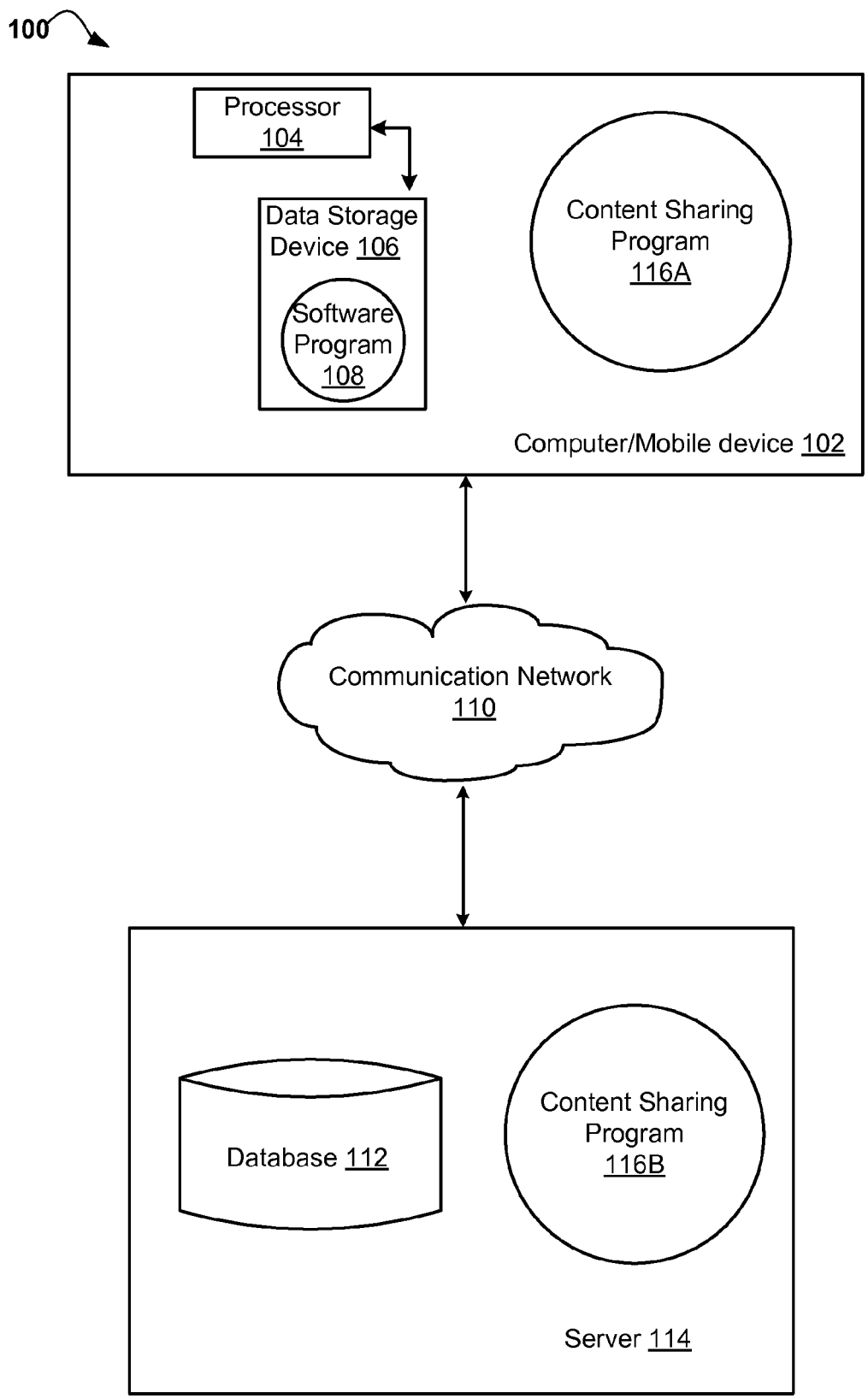
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to mobile ad hoc networks. The following described exemplary embodiments provide a system, method and program product to, among other things, provide content sharing in mobile ad hoc networks. Therefore, the present embodiment has the capacity to improve the technical field of ad hoc networks by providing content sharing in a directoryless, infrastructureless mobile ad hoc network. More specifically, the present embodiment may allow network members to be able to search for content by broadcasting a request for content by keyword. Peers who have registered content for sharing may respond to these requests by sending the matching content to the requester. Optionally, for larger content, an identifier can be returned to the requester which provides the option for the requester to request the larger content from a specific responder using the identifier. As such, these processes allow mobile devices in a mobile ad hoc network to register certain content for sharing, share that content with other network members, and find and retrieve content from other network members, without relying on any fixed infrastructure or directories.

As previously described, MANETs allow mobile wireless devices to connect to each other in an ad hoc manner when they come within range of each other, and disconnect when they move out of range. Additionally since nodes in a MANET connect to each other as they come within range, the nodes that any one member connects to can change as nodes move about in relation to each other. MANETs do not require, and cannot expect, any fixed infrastructure to operate and are sometimes referred to as "infrastructureless". As such, members of a MANET cannot reply on any particular node being present in the network at any one time. Therefore, this may pose a problem for content sharing where traditional sharing methods typically involve directories of content hosted by known and highly available nodes, such as search engines. Currently, some peer-to-peer content sharing services which, similar to MANETs, cannot rely on any particular peer being in the "network" at any one time, have used a signature file that identifies particular content a peer is interested in, and known tracker nodes that coordinate sharing between peers interested in the same content. Other solutions may allow peers to find each other through "supernodes", which are known and generally available peers with significant bandwidth capability. However, such solutions require a fixed infrastructure of sorts and are not suitable for an infrastructureless MANET. In the infrastructureless case, no member can assume any particular node is available, content directory host, tracker, supernode or otherwise. Consequently, MANET members have no immediate means to share content. As such, it may be advantageous, among other things, to provide a method and apparatus for content sharing in mobile ad hoc networks in a directoryless, infrastructureless environment.

According to at least one implementation, the present embodiment may register content sharing; request content by a keyword; provide a response to a request for content by the keyword, and optionally, for larger content (i.e., large files), request for content by an identifier and provide a response to a request for content by the identifier.

More specifically, a first component may register content on a device for sharing, and associate descriptive keywords with the content. A second component may then prompt for descriptive keywords of desired content, and broadcast a request for the desired content with the keywords while displaying responses to the request on the device. Additionally, a third component may respond with content to requests for content in the event that keywords in the request match local content registered for sharing. Furthermore, in the event of larger content, the second component may receive an identifier for large content in response to a request for content, and may request content from the responder using the identifier. Then, the third component responding with an identifier in the case of large content, may respond with content associated with an identifier when requested.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for content sharing in mobile ad hoc networks. As previously described, content sharing in mobile ad hoc networks may be problematic as traditional methods for content sharing are unsuitable in a directoryless, infrastructureless environment. According to at least one implementation, the present embodiment may include the following five interrelated processes: registration of content for sharing; request for content by keyword; response to a request for content by keyword; and optionally for larger content, (e.g. large files): request for content by identifier; and response to a request for content by identifier. According to the present embodiment, network members can search for content by broadcasting a request for content by keyword. Then, peers who have registered content for sharing, may respond to these requests by sending the matching content to the requester. Optionally, for larger content, an identifier can be returned to the requester which provides the option for the requester to request the larger content from a specific responder using the identifier.

As such, these processes may allow mobile devices in a mobile ad hoc network to register certain content for sharing, share that content with other network members, and find and retrieve content from other network members, without relying on a fixed infrastructure or directories. For example, mobile device users, such as smartphone or tablet users in a large city, may share content on their phone (e.g., classifieds or advertisements for jobs) with other participating devices in the city (geographic extent of the mobile ad hoc network), and find and retrieve content from those same participants, without using a phone network (such as 4G) and without using the internet.

Referring to FIG. 1, an exemplary networked computer environment 100 in accordance with one embodiment is depicted. The networked computer environment 100 may include a computer/mobile device 102, a processor 104, and a data storage device 106 that is enabled to run a software program 108 and a Content Sharing Program 116A. The networked computer environment 100 may also include a server 114 that is enabled to run a Content Sharing Program 116B and that may interact with a database 112 and a communication network 110. The networked computer environment 100 may include a plurality of computers/mobile devices 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer/mobile device 102 may communicate with the Content Sharing Program 116B running on server computer 114 via the communications network 110. The communications network 110 may include connections, such as wire, wireless communication links, or fiber optic cables. As will be discussed with reference to FIG. 6, server computer 114 may include internal components 800a and external components 900a, respectively, and client computer/mobile device 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer/mobile device 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Content Sharing Program 116A, 116B may interact with a database 112 that may be embedded in various storage devices, such as, but not limited to a computer 102, a networked server 114, or a cloud storage service.

As previously described, the client computer/mobile device 102 may access the Content Sharing Program 116B, running on server computer 114 via the communications network 110. For example the Content Sharing Program 116A, 116B running on a client computer/mobile device 102 and server computer 114 may allow a user to share content with other network members. As such, the network members may find and retrieve content from other network members, without relying on any fixed infrastructure or directories. The Content Sharing method is explained in more detail below with respect to FIGS. 2-5.

Figure 2:
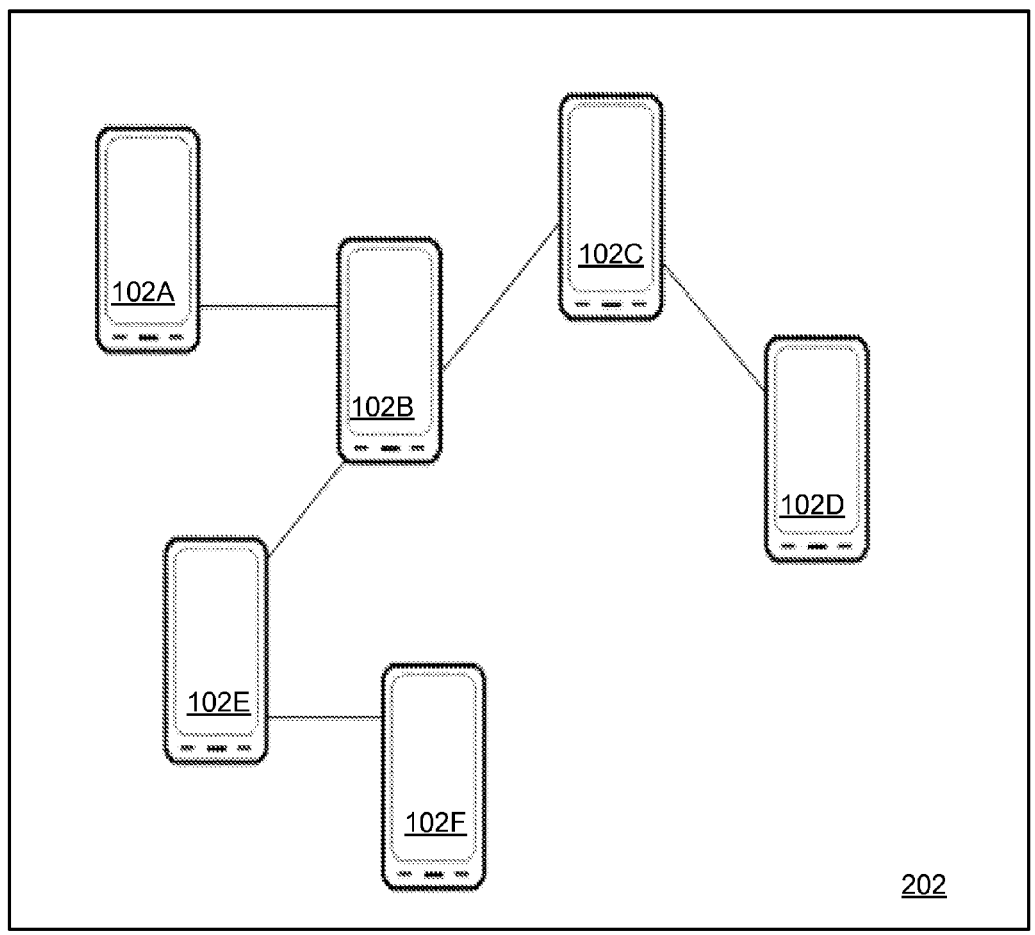
FIG. 2 illustrates a networked computer environment according to at least one embodiment.

Referring now to FIG. 2, an exemplary network computer environment 200 in accordance with one embodiment is depicted. According to at least one implementation of the present embodiment, mobile devices, such as smartphones 102A-102F, may form a mobile ad hoc network 202 based on the physical proximity to each other. For example, a user of a mobile device, such as a smartphone 102A may share content on their phone 102A with other participating devices 102B-102F in close proximity (geographic extent of the mobile ad hoc network 202), and find and retrieve content from those same participants 102B-102F, without using a phone network and without using the internet.

Figure 3:
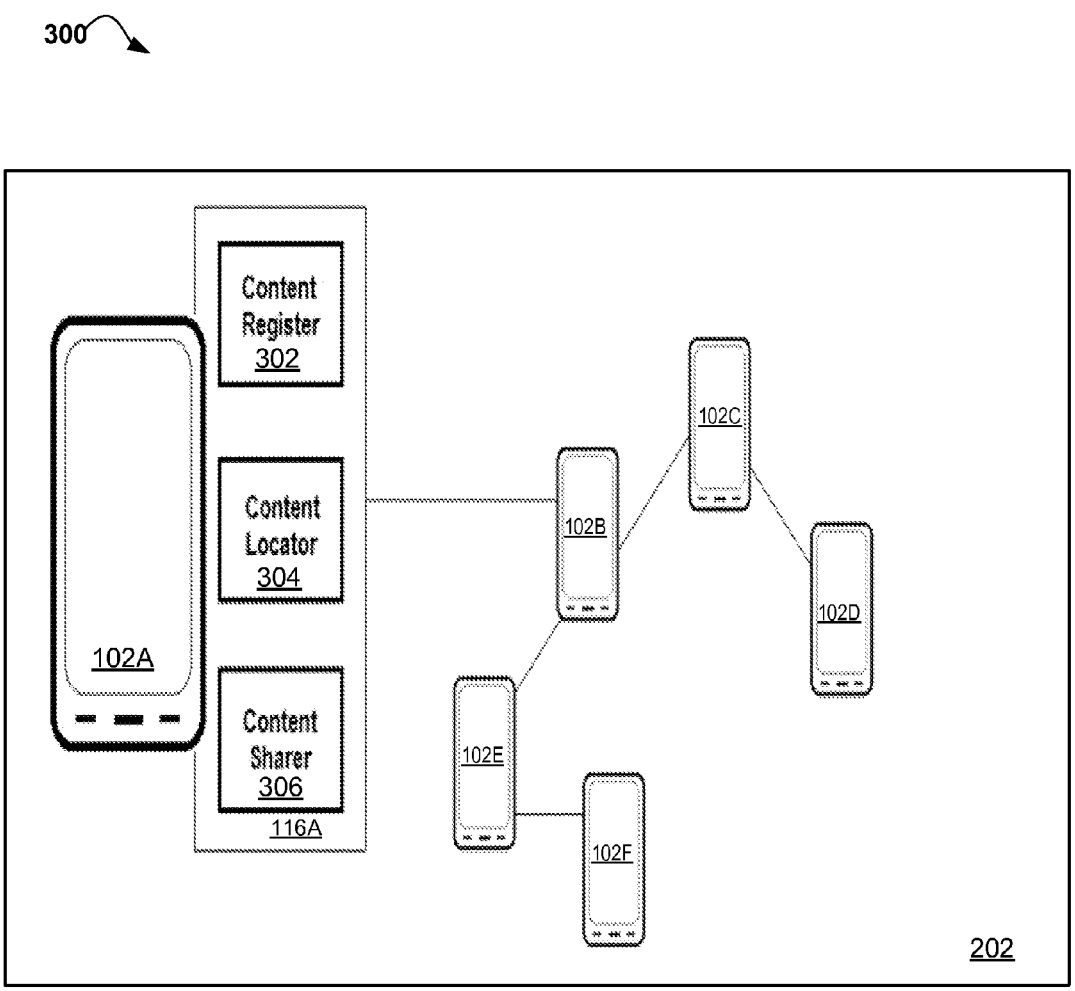
FIG. 3 is an exemplary illustration of the components associated with a program that provides content sharing in mobile ad hoc networks according to at least one embodiment.

Referring now to FIG. 3, an exemplary illustration 300 of components associated with a program that provides content sharing in mobile ad hoc networks in accordance with one embodiment is depicted. According to at least one implementation, the Content Sharing Program 116A may include the following components: a Content Register 302; a Content Locator 304; and a Content Sharer 306. The components 302-306 are illustrated as software components, installed on a mobile device 102A. As such, each component 302-306 may perform its operation in isolation to the other components 302-306, but in a complimentary fashion. For illustration purposes only, the Content Sharing Program 116A (depicted as being installed on a smartphone 102A) may be installed on other devices (i.e., such as other smartphones 102B-102F) in the network 202.

According to the present embodiment, The Content Register component 302 may allow the user of the device 102A to register specific content on the device 102A as shareable. For example, a short classified text, a bio, or general information may be registered as content that is shareable. The registration process involves the following two steps: 1) identification of specific content for sharing, and 2) the scanning of the same for keyword, or prompting the user of the device 102A to supply keywords that match the shareable content.

Additionally, the Content Locator component 304 enables the mobile device 102A to find content on remote devices 102B-102F in the network 202. As such, the Content Locator 304 prompts the user of the requesting device 102A for keywords that might match desired content on a remote device 102B-102F and then broadcasts a "request for content" with the keywords across the network 202. The Content Locator 304 then waits for responses which it can be displayed on the device 102A.

Furthermore, the Content Sharer component 306 may respond to Content Locator 304 requests for content. For example, if there is content on a device 102A that has been registered for sharing by the Content Register component 302, and that content matches the keywords associated with the shareable content on the device 102A, then the Content Sharer component 306 may respond to Content Locator 304 requests for content. As such, if the content is shareable and matches, the Content Sharer component 306 sends the content back from the local device 102B-102F to the requesting device 102A.

According to an alternate implementation, the present embodiment may also allow for larger content. As such, the Content Sharer component 306 may send an identifier for the content that includes its size, and the Content Locator component 304, when directed by the user of the requesting mobile device 102A, may send a specific request for the content using the identifier provided by the Content Sharer component 306.

Figure 4:
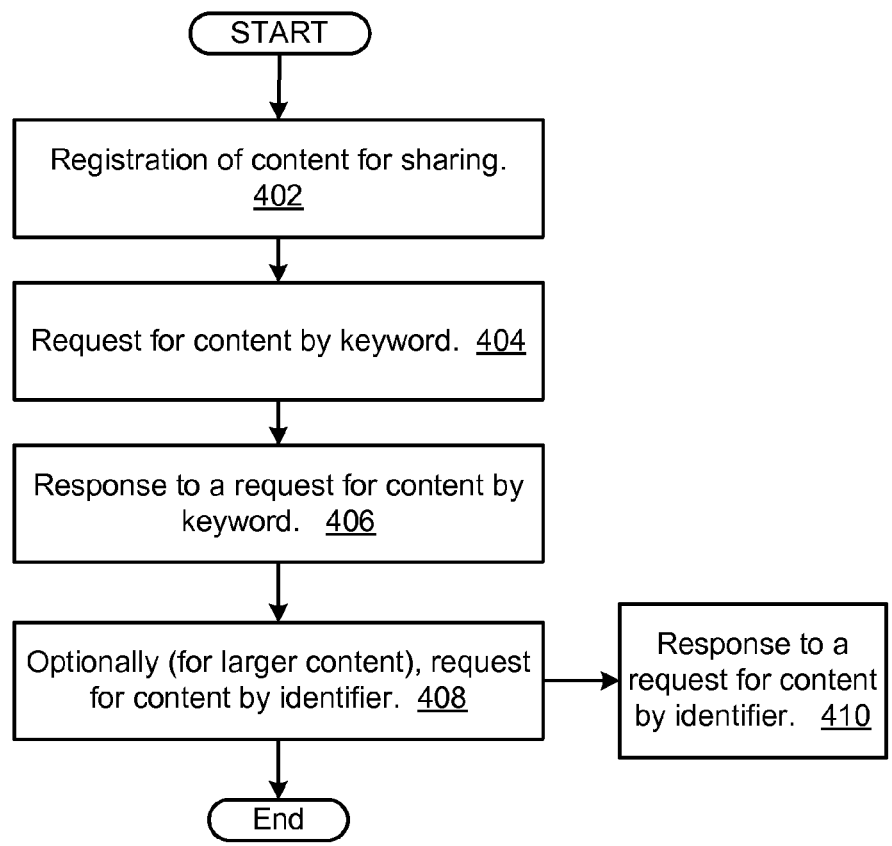
FIG. 4 is an operational flowchart illustrating the steps carried out by a program to provide content sharing in mobile ad hoc networks according to at least one embodiment.

Referring now to FIG. 4, an operational flowchart 400 illustrating the steps carried out by a program that provides content sharing in mobile ad hoc networks are depicted. According to at least one implementation, the present embodiment includes five interrelated processes that enable content sharing in a directoryless, infrastructureless mobile ad hoc network. As such, network members can search for content by broadcasting a request for content by keyword. Peers who have registered content for sharing may respond to these requests by sending the matching content to the requester. Optionally, for larger content, an identifier can be returned to the requester which provides the option for the requester to request the larger content from a specific responder using the identifier.

As such, with respect to FIG. 4 at 402, the Content Sharing Program 116A, 116B (FIG. 1) includes the process of registration of content for sharing. As such, the process of registration of content for sharing involves flagging content on a mobile device 102B-102F (FIG. 3) as shareable. For example, a user may enter a short message and select a "share" option. However, in accordance with one implementation with respect to larger (or non-human readable) files, one or more keywords that describe the shareable content can be entered by the user of the requesting device 102A (FIG. 3).

Next, at 404, the Content Sharing Program 116A, 116B (FIG. 1) includes the process of request for content by keyword. As such, the process of request for content by keyword involves building and broadcasting from a mobile device 102A (FIG. 3) a request for content, where the request includes the address of the requester and one or more keywords that describe the desired content.

Then at 406, the Content Sharing Program 116A, 116B (FIG. 1) includes the process of responding to a request for content by keyword. Therefore, the process of responding to a request for content by keyword involves responding by a mobile device 102B-102F (FIG. 3) to requests for content by keyword (see process of request for content by keyword previously described in step 404) to the address expressed in the request, where one or more keywords in or associated with content registered on the responding device (102B-102F) (FIG. 3) (as described in step 402 for the process of registration of content for sharing) match one or more keywords expressed in the request, the response including the shareable content. Optionally, (as described below in steps 408 and 410) for larger files, the response including the address of the responder, and an identifier that identifies the matching content.

Optionally, the Content Sharing Program 116A, 116B (FIG. 1) includes two additional processes for registration of content for sharing larger content, such as larger files. At 408, the Content Sharing Program 116A, 116B (FIG. 1)

includes the process of request for content by identifier. The process of response to a request for content by identifier, optionally for larger files, involves building and sending from a mobile device 102A (FIG. 3) a request for content by identifier to the address of a responder that responded to a request for content by keyword (see steps 404 and 406 above), whereby the identifier matches the identifier identified in the response to a request for content by keyword (see step 406 above), and the request for content by identifier includes the address of the requester.

Then at 410, the Content Sharing Program 116A, 116B (FIG. 1) includes the process of response to a request for content by identifier. As such, the process of response to a request for content by identifier involves responding by a mobile device 102B-102F (FIG. 3) to a request for content by identifier (see step 408) to the address expressed in the request for content by identifier, and the response includes the content identified by the identifier.

It may be appreciated that FIG. 4 provides only an illustration of one implementation and do not imply any limitations with regard to how different embodiments may be implemented. Many modifications to the depicted environments may be made based on design and implementation requirements. The present embodiment may provide a mechanism to register content on a device that is "shareable" to all other devices in the ad hoc network by indicating what data on a device is searchable or sharable. As previously mentioned, the present embodiment may optionally include two additional processes for registration of content for sharing larger content, such as larger files. Therefore, a pre-determined threshold may be used to determine if the size of the data is equal to or less than a certain size limit as to avoid flooding the network.

According to at least one implementation, a mobile application could be created on a wireless device to allow for the selecting of what content can be shared. For example, an embodiment may use the "app" to share or display advertising material. Furthermore, rather than only searching content from a device in its immediate proximity in the network, (e.g., the device being searched must be in direct broadcast range from the initiating device), the present embodiment may retrieve data from a device anywhere in the ad hoc network. For example, the device requesting the content can be on the other side of a major city than the device providing the content. The devices only need to be on the same ad hoc network as each other, so the content can be passed through multiple devices to the recipient.

As such, the present embodiment includes a content register on each mobile device and a content search application to allow a user to search for data within another device's content register. For example, the content register can make specific content on a device available for sharing and allow for the registration of specific key words to identify a piece of content (for search queries).

Additionally, the present embodiment has the ability to restrict or limit content being shared based on a maximum size limit, to prevent flooding of the network with large amounts of data. The present embodiment may work in an ad hoc network, where mobile devices can come and go from the network at any time. Furthermore, no fixed topology needs to be determined, and the content information is stored on each mobile device rather than a central database.

Significantly, the present embodiment sits on top of the network protocol layer and involves content sharing, registering content for sharing on a mobile device, and searching devices on an ad hoc network for specific content. More specifically, the searching is implemented via broadcasting across an ad hoc network for content, through multiple connected devices and rather than only referring to search keywords, the present embodiment may refer to the actual storage or transmission of content.

Figure 5:
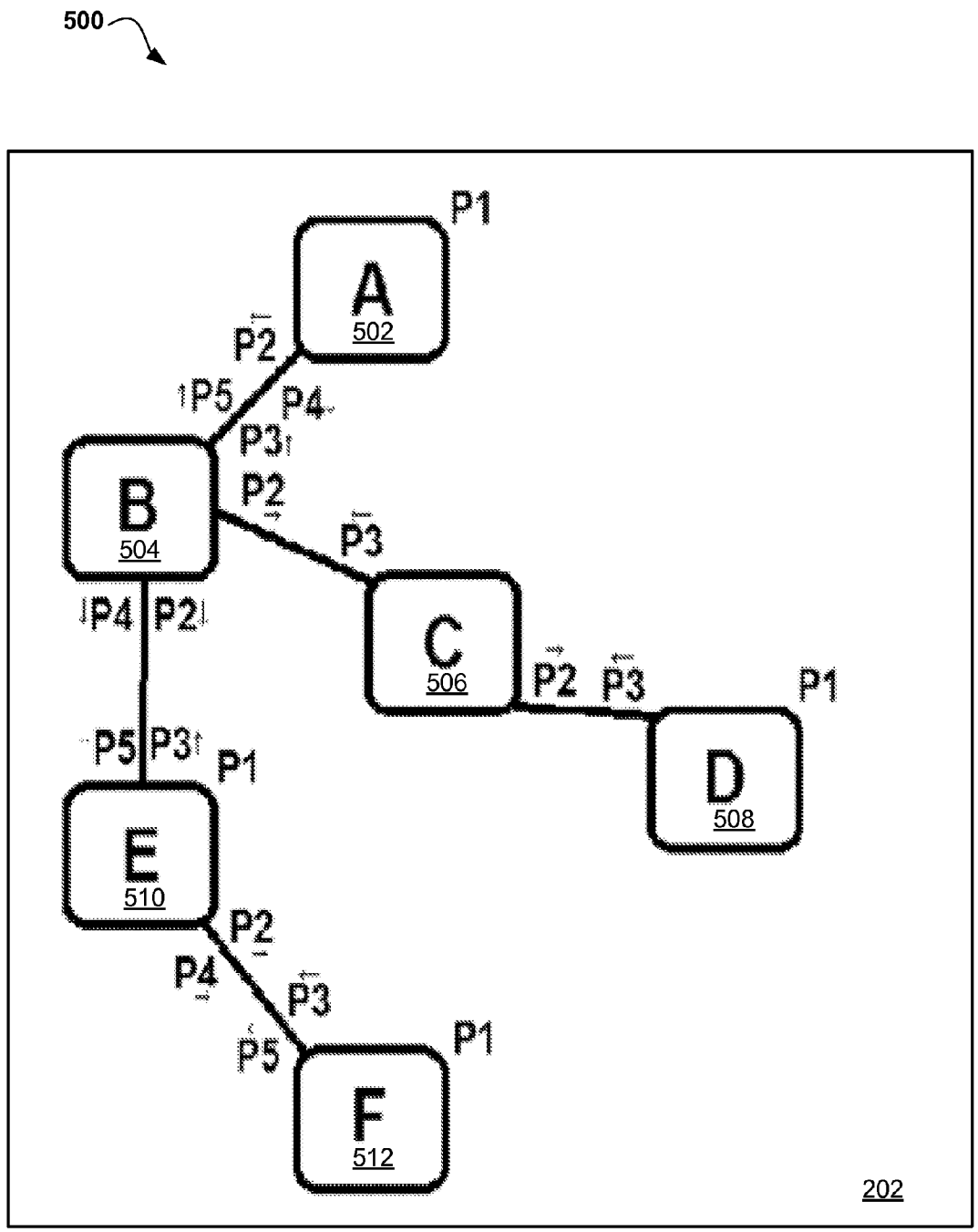
FIG. 5 is an exemplary illustration of the processes for a program that provides content sharing in mobile ad hoc networks according to at least one embodiment.

Referring now to FIG. 5, an exemplary illustration 500 of the processes for a program that provides content sharing in mobile ad hoc networks in accordance with one embodiment is depicted. As previously described, the present embodiment allows for sharing content, such as classifieds or html-style content similar to web pages on wireless mobile devices (e.g., smartphones and tablets), such that each mobile device may become a mobile host, as opposed to fixed infrastructure hosting and associated technologies as currently utilized in the internet. The present embodiment enables mobile devices to find and view content on participating devices, and operates in a non-fixed infrastructure environment such as an ad hoc network.

With respect to FIG. 5, four nodes within the mobile ad hoc network 202 register content for sharing using process 1 ((P1)—the process of registration of content for sharing) (i.e., step 402 (FIG. 4)): nodes A 502, D 508, E 510 and F 512.

Node A 502 then issues a request for content by keyword (process 2 (P2)) (i.e., step 404 (FIG. 4)) which is propagated to each node 502-512 in the network 202.

Two nodes (D 508 and F 512) respond to the request for content by keyword (process 3 (P3)) (i.e., step 406 (FIG. 4), which is propagated back to node A 502 via nodes B 504, C 506 and E 510. In this example, node D 508 responds with the content and node F 512 with an identifier (i.e. large file case).

Node A 502, the requester, now has the content shared by node D 508, and an identifier for content hosted by node F 512. Node A 502 can now choose to request content by identifier (process 4 (P4) (i.e., step 408 (FIG. 4)) from node F 512, which is propagated via nodes B 504 and E 510.

Node F 512 responds to node A's 502 request for content by identifier (process 5 (P5)) (i.e., step 410 (FIG. 4)) by sending the identified content, which is routed through nodes E 510 and B 504 back to node A 502.

For each process, with the exception of process P1 (i.e., the process of registration of content for sharing) 402 (FIG. 4)), the acting mobile device 102A-102F (FIG. 2) is an active member of the MANET 202 of both the requester and the responder. Additionally, the transmission between nodes 502-512 within the MANET 202 is achieved using existing transmission protocols available to mobile ad hoc networks.

These processes, P1-P5 (i.e., 402-410 (FIG. 4)) allow mobile devices 102A-102F (FIG. 2) in a mobile ad hoc network 202 to register certain content for sharing, share that content with other network members, and find and retrieve content from other network members, without relying on any fixed infrastructure or directories. Application program interfaces (APIs) exist for network broadcast and network point-to-point communication and these can vary across operating systems. As such, according to at least one implementation of the present embodiment, achieving processes P2 through P5 may involve programmatically calling such APIs.

Figure 6:
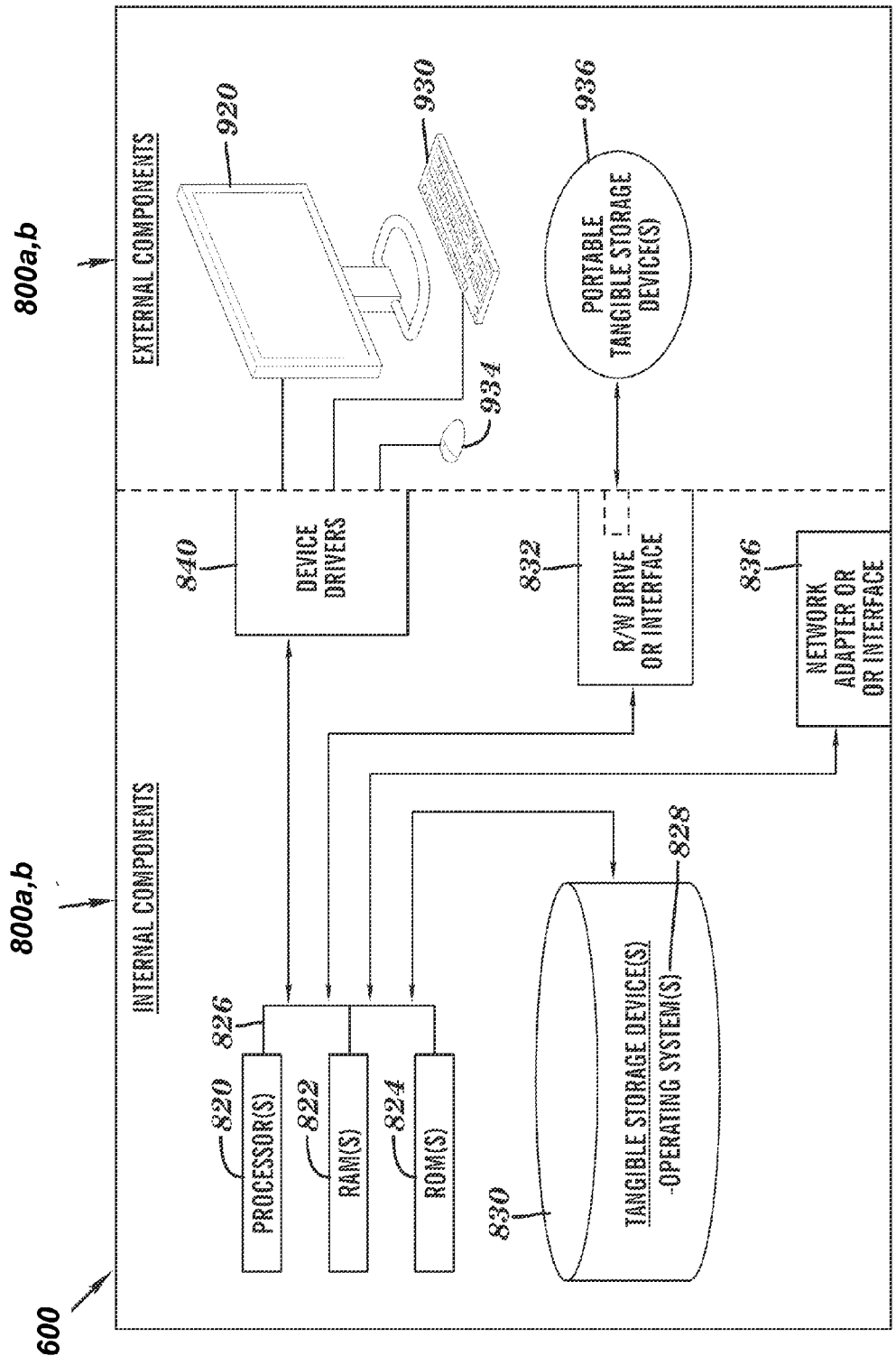
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Content Sharing Program 116A (FIG. 1) in client computer 102 (FIG. 1) and the Content Sharing Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Content Sharing Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Content Sharing Program 116A (FIG. 1) in client computer 102 (FIG. 1) and the Content Sharing Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Content Sharing Program 116A (FIG. 1) in client computer 102 (FIG. 1) and the Content Sharing Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
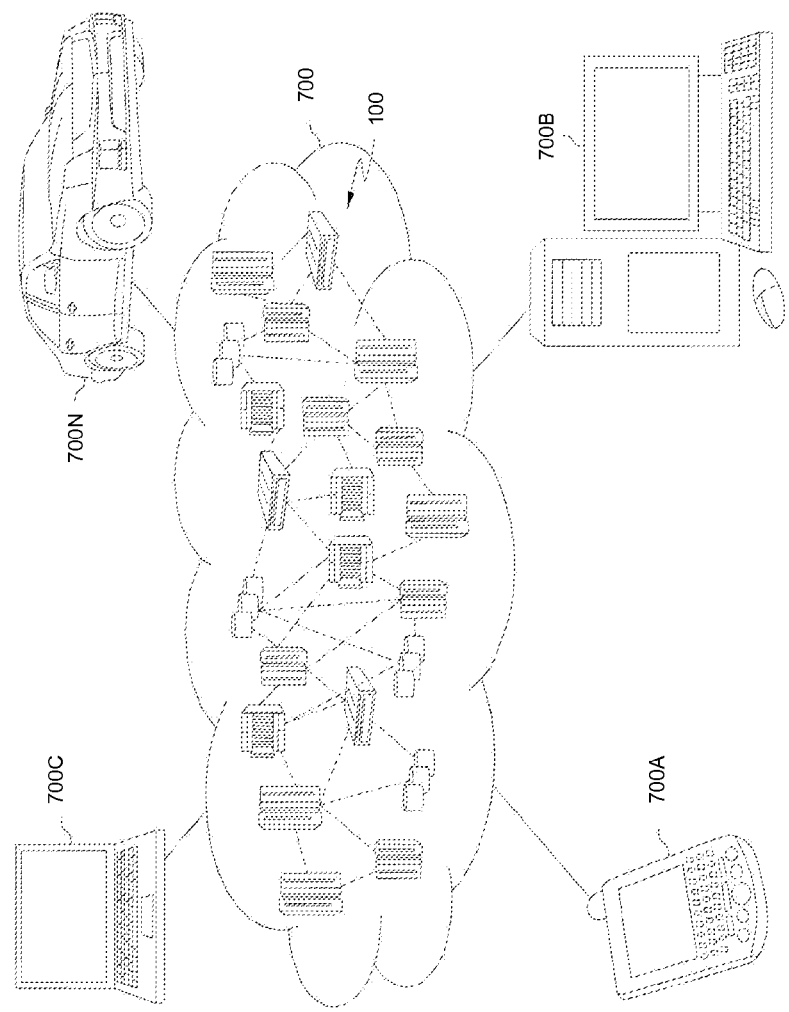
FIG. 7 is a block diagram of an illustrative cloud computing environment including the computer system depicted in FIG. 1, according to at least one embodiment.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
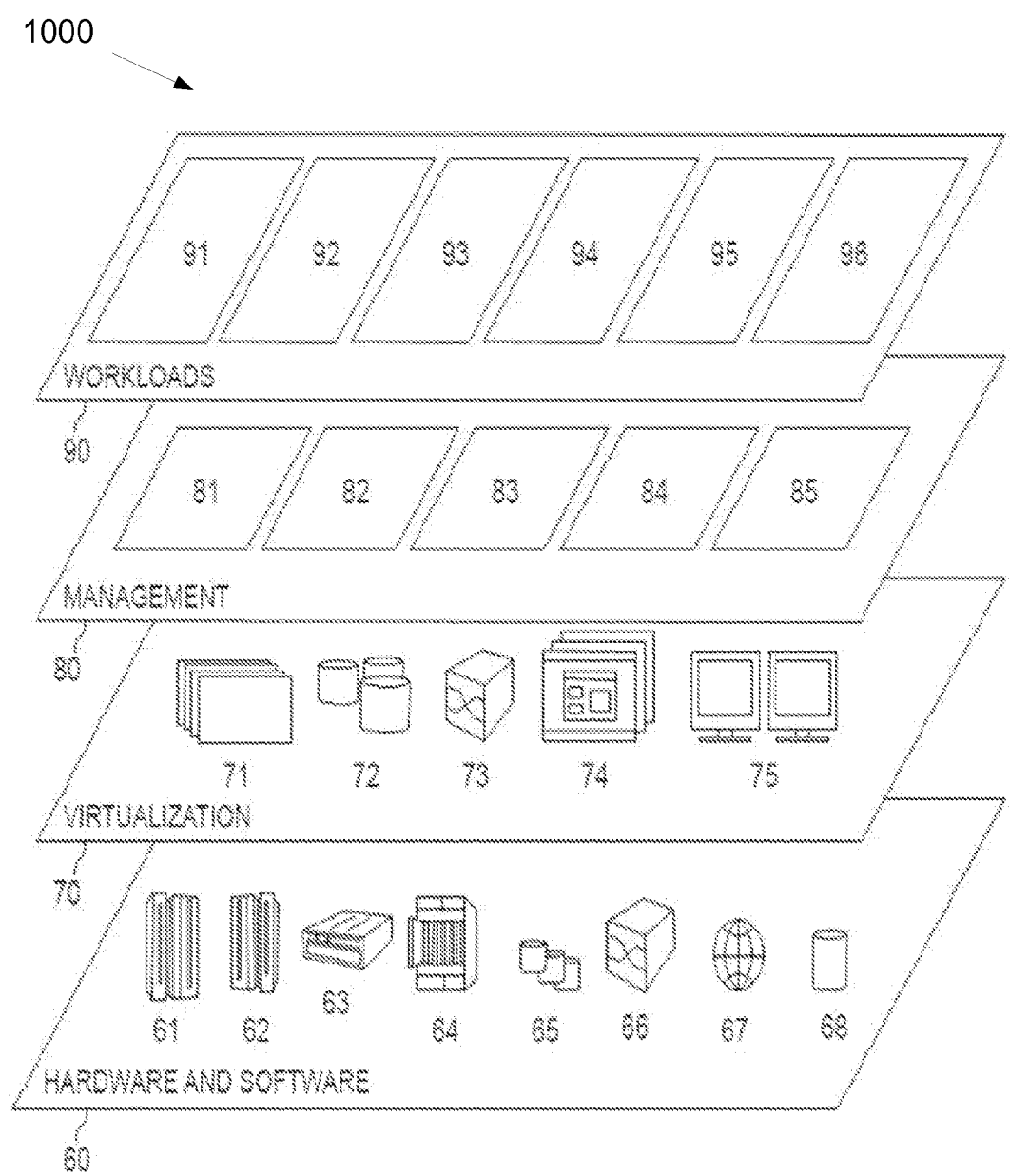
FIG. 8 is a block diagram of functional layers of the illustrative cloud computing environment of FIG. 7, according to at least one embodiment.

Referring now to FIG. 8, a set of functional abstraction layers 1000 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content sharing 96. A Content Sharing Program 116A, 116B (FIG. 1) may provide content sharing in mobile ad hoc networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for sharing a plurality of content in a mobile ad hoc network, the method comprising:

registering, by a processor, the plurality of content for sharing on a first mobile device, wherein the registered plurality of content is associated with a plurality of descriptive keywords, wherein the registering of the plurality of content for sharing on the first mobile device is in response to a selection of a share option on the first mobile device that allows for a specific plurality of content stored on the first mobile device to be available for sharing with at least one other mobile device in the mobile ad hoc network, and wherein the registration of the plurality of descriptive keywords associated with the registered plurality of content for sharing comprises registering at least one specific keyword to be used to identify the registered plurality of content for sharing; and responding, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

2. The method of claim 1, further comprising:

requesting, by the second mobile device, the plurality of content for sharing by at least one identifier, wherein the registered plurality of content is associated with at least one identifier; and responding, by the first mobile device, to the request for the plurality of content for sharing by the least one identifier, wherein the responding comprises determining that the request for the plurality of content for sharing by at least one identifier matches the at least one identifier.

3. The method of claim 2, wherein the plurality of content for sharing by the at least one identifier is equal to or less than a predetermined threshold data size.

4. The method of claim 1, wherein the request for the plurality of content for sharing by at least one keyword comprises broadcasting the request.

5. The method of claim 1, wherein the request for the plurality of content for sharing by at least one keyword comprises displaying a plurality of responses to the request.

6. The method of claim 2, wherein the request for the plurality of content for sharing by at least one identifier comprises broadcasting the request.

7. The method of claim 2, wherein the request for the plurality of content for sharing by at least one identifier comprises displaying a plurality of responses to the request.

8. A computer system for sharing a plurality of content in a mobile ad hoc network, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is configured to perform a method comprising:

registering, by a processor, the plurality of content for sharing on a first mobile device, wherein the registered plurality of content is associated with a plurality of descriptive keywords, wherein the registering of the plurality of content for sharing on the first mobile device is in response to a selection of a share option on the first mobile device that allows for a specific plurality of content stored on the first mobile device to be available for sharing with at least one other mobile device in the mobile ad hoc network, and wherein the registration of the plurality of descriptive keywords associated with the registered plurality of content for sharing comprises registering at least one specific keyword to be used to identify the registered plurality of content for sharing; and responding, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

9. The computer system of claim 8, further comprising:

requesting, by the second mobile device, the plurality of content for sharing by at least one identifier, wherein the registered plurality of content is associated with at least one identifier; and responding, by the first mobile device, to the request for the plurality of content for sharing by the least one identifier, wherein the responding comprises determining that the request for the plurality of content for sharing by at least one identifier matches the at least one identifier.

10. The computer system of claim 9, wherein the plurality of content for sharing by the at least one identifier is equal to or less than a predetermined threshold data size.

11. The computer system of claim 8, wherein the request for the plurality of content for sharing by at least one keyword comprises broadcasting the request.

12. The computer system of claim 8, wherein the request for the plurality of content for sharing by at least one keyword comprises displaying a plurality of responses to the request.

13. The computer system of claim 9, wherein the request for the plurality of content for sharing by at least one identifier comprises broadcasting the request.

14. The computer system of claim 9, wherein the request for the plurality of content for sharing by at least one identifier comprises displaying a plurality of responses to the request.

15. A computer program product for sharing a plurality of content in a mobile ad hoc network, the computer program product comprising:

one or more computer-readable storage devices and program instructions stored on at least one of the one or more tangible storage devices, the program instructions executable by a processor, the program instructions comprising:

program instructions to register, by a processor, the plurality of content for sharing on a first mobile device, wherein the registered plurality of content is associated with a registered plurality of descriptive keywords, wherein the registering of the plurality of content for sharing on the first mobile device is in response to a selection of a share option on the first mobile device that allows for a specific plurality of content stored on the first mobile device to be available for sharing with at least one other mobile device in the mobile ad hoc network, and wherein the registration of the plurality of descriptive keywords associated with the registered plurality of content for sharing comprises program instructions to register at least one specific keyword to be used to identify the registered plurality of content for sharing; and program instructions to respond, by the first mobile device, to a request by a second mobile device for the plurality of content for sharing by the at least one keyword, wherein the responding comprises determining the request for the plurality of content for sharing by at the least one keyword matches at least one keyword within the registered plurality of descriptive keywords.

16. The computer program product of claim 15, further comprising:
  program instructions to request, by the second mobile device, the plurality of content for sharing by at least one identifier, wherein the registered plurality of content is associated with at least one identifier; and
  program instructions to respond, by the first mobile device, to the request for the plurality of content for sharing by the least one identifier, wherein the responding comprises determining that the request for the plurality of content for sharing by at least one identifier matches the at least one identifier.

17. The computer program product of claim 16, wherein the plurality of content for sharing by the at least one identifier is equal to or less than a predetermined threshold data size.

18. The computer program product of claim 15, wherein the request for the plurality of content for sharing by at least one keyword comprises broadcasting the request.

19. The computer program product of claim 15, wherein the request for the plurality of content for sharing by at least one keyword comprises displaying a plurality of responses to the request.

20. The computer program product of claim 16, wherein the request for the plurality of content for sharing by at least one identifier comprises broadcasting the request.

* * * * *